United States Patent
Anschel et al.

(10) Patent No.: US 8,590,305 B2
(45) Date of Patent: Nov. 26, 2013

(54) SIMPLIFIED VARIABLE GEOMETRY TURBOCHARGER WITH VARIABLE NOZZLE

(75) Inventors: Paul Anschel, Asheville, NC (US); Rajmohan Chandramohanan, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 317 days.

(21) Appl. No.: 13/132,994

(22) PCT Filed: Dec. 4, 2009

(86) PCT No.: PCT/US2009/066687
§ 371 (c)(1),
(2), (4) Date: Jun. 6, 2011

(87) PCT Pub. No.: WO2010/068558
PCT Pub. Date: Jun. 17, 2010

(65) Prior Publication Data
US 2011/0232282 A1    Sep. 29, 2011

Related U.S. Application Data

(60) Provisional application No. 61/121,728, filed on Dec. 11, 2008.

(51) Int. Cl.
*F02D 23/00* (2006.01)
*F04D 29/44* (2006.01)
*F04D 29/54* (2006.01)
*F01D 17/12* (2006.01)

(52) U.S. Cl.
USPC ........... 60/602; 415/158; 415/198.1; 415/126

(58) Field of Classification Search
USPC ......... 60/602; 415/150, 157–158, 126, 198.1, 415/203–204, 208.3; 417/407
See application file for complete search history.

(56) References Cited

U.S. PATENT DOCUMENTS

| | | | | |
|---|---|---|---|---|
| 2,996,995 | A | * | 8/1961 | Culaud ...................... 415/198.1 |
| 3,196,798 | A | * | 7/1965 | Coucet et al. ............. 415/198.1 |
| 3,365,120 | A | * | 1/1968 | Jassniker ...................... 415/158 |
| 4,056,330 | A | * | 11/1977 | Lieber ............................ 415/158 |
| 4,147,467 | A | * | 4/1979 | Leicht et al. .................. 417/407 |
| 4,643,639 | A | * | 2/1987 | Caine ......................... 415/208.3 |
| 4,776,168 | A |  | 10/1988 | Woollenweber |
| 5,087,176 | A | * | 2/1992 | Wieland ........................ 417/407 |

(Continued)

FOREIGN PATENT DOCUMENTS

GB    1554074 A    10/1979
JP    53-016115 A    2/1978

(Continued)

Primary Examiner — Thai Ba Trieu
(74) Attorney, Agent, or Firm — Miller Canfield

(57) ABSTRACT

The flow path of exhaust gas to the turbine wheel (70) of a twin volute turbocharger is influenced by the shape and size of the nozzle formed by the shape (22) of the divider wall (21) and the shape of the flow passage determined by the walls (85, 86) of the turbine housing. By moving the walls (85, 86) toward, or away from the divider wall, the flow of exhaust gas through the nozzle, to the turbine wheel (70) can be modulated, which thus modulates the turbocharger boost pressure. The invention also applies to single volute turbines.

9 Claims, 15 Drawing Sheets

(56) References Cited

U.S. PATENT DOCUMENTS

| | | |
|---|---|---|
| 6,431,823 B1 * | 8/2002 | Slepoy ........................... 415/150 |
| 6,443,696 B1 | 9/2002 | Erdmann et al. |
| 6,553,762 B2 * | 4/2003 | Loffler et al. ................. 415/203 |
| 6,726,447 B2 * | 4/2004 | Lutz .............................. 415/158 |
| 8,291,703 B2 * | 10/2012 | Garrett et al. ................... 60/602 |
| 2003/0026692 A1 * | 2/2003 | Lutz .............................. 415/158 |

FOREIGN PATENT DOCUMENTS

| | | |
|---|---|---|
| JP | 2002-534626 A | 10/2002 |
| WO | 00-73630 A1 | 12/2000 |
| WO | 2007-058647 A1 | 5/2007 |

\* cited by examiner

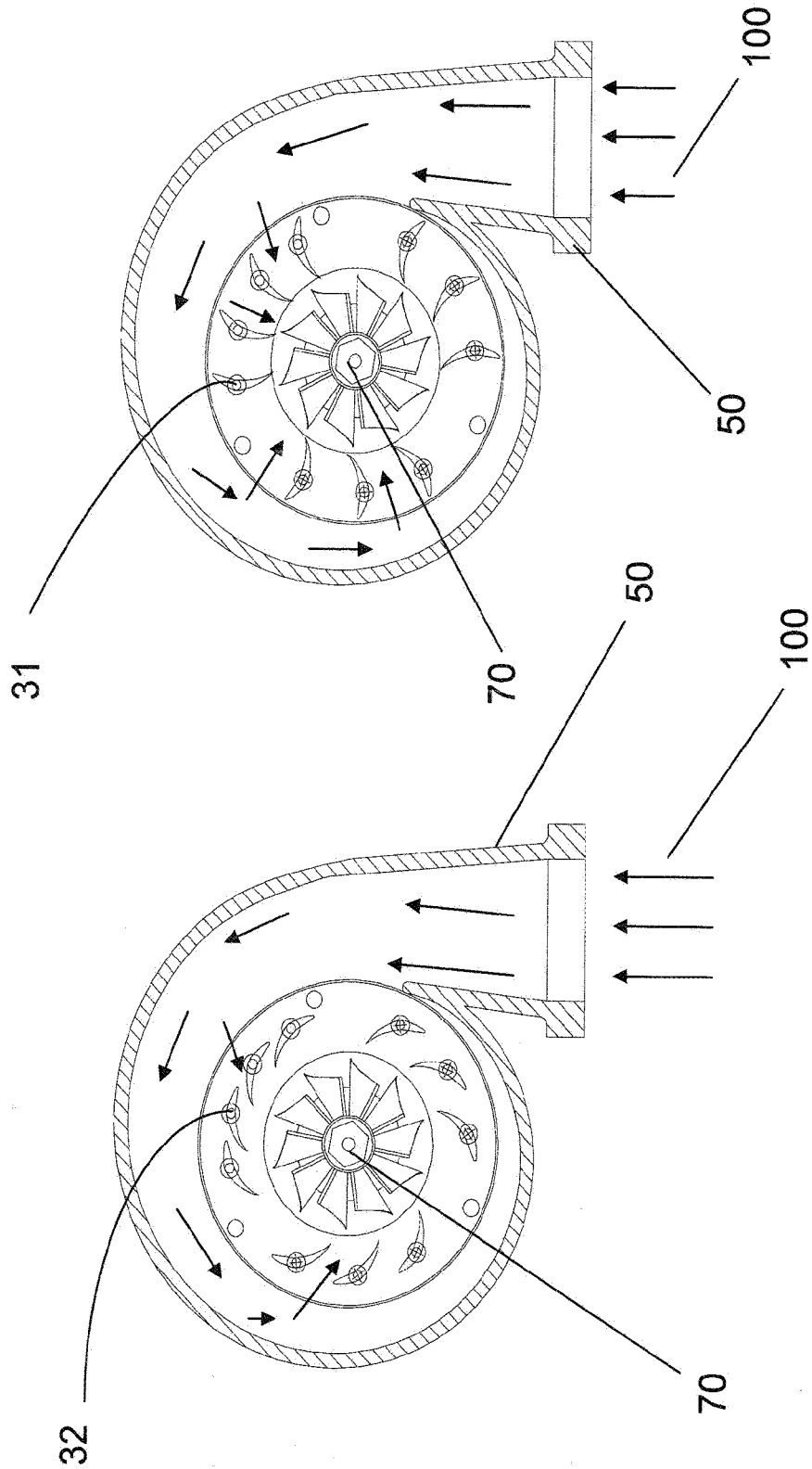

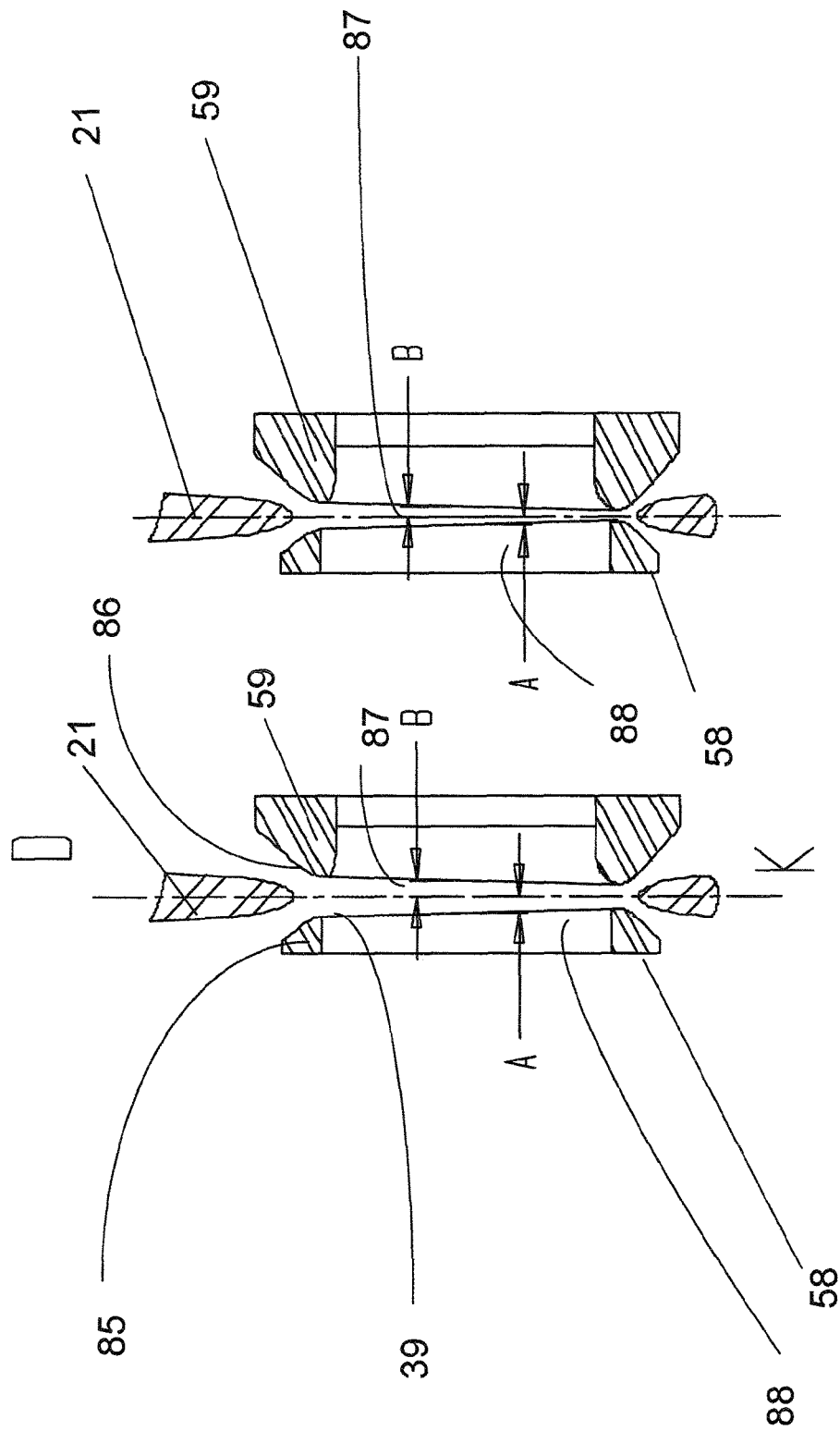

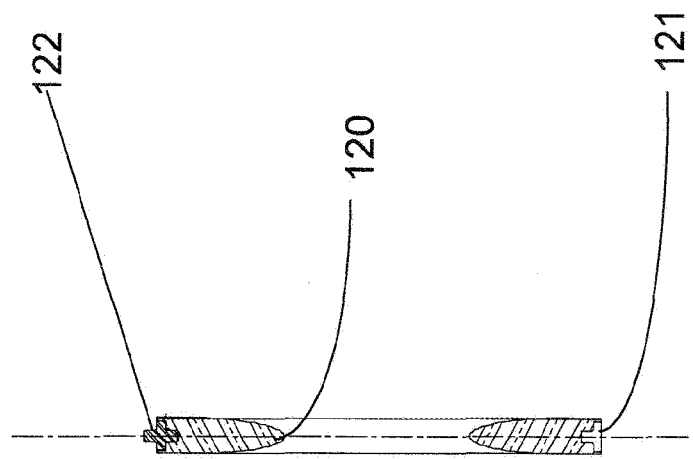
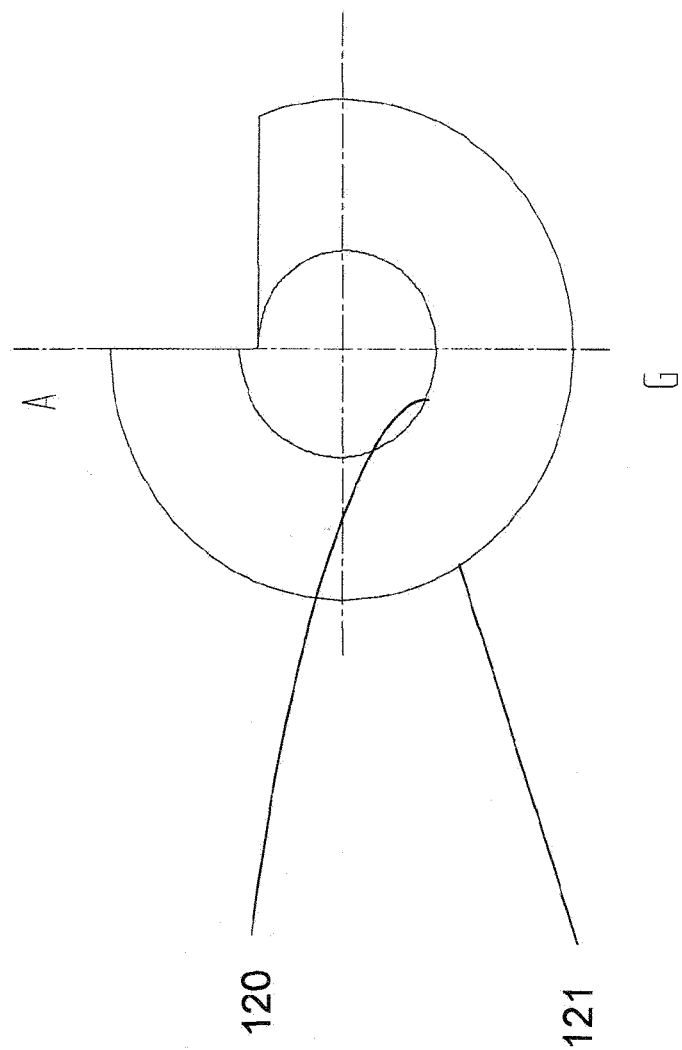
Fig. 12B
Fig. 12A

SIMPLIFIED VARIABLE GEOMETRY TURBOCHARGER WITH VARIABLE NOZZLE

FIELD OF THE INVENTION

This invention relates to a simplified, low cost, variable nozzle to control exhaust gas flow to a turbine wheel in a variable flow turbocharger. Thus boost pressure can be modulated by controlling the nozzle flow volume. More particularly, the invention provides a variable nozzle turbocharger which produces change of turbine flow with acceptable resolution, at a cost lower than that for a VTG turbocharger. By altering the nozzle volume between the divider wall and the contour, the turbine flow to the turbine wheel can be modulated, and thus the boost level output of the turbocharger may also be modulated.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers (FIG. 1) use the exhaust flow (100), which enters the turbine housing at the turbine inlet (51) of the turbine housing (2), from the engine exhaust manifold to drive a turbine wheel (70), which is located in the turbine housing. The turbine wheel is solidly affixed to a shaft, the other end of which contains a compressor wheel which is mounted to the shaft and held in position by the clamp load from a compressor nut. The primary function of the turbine wheel is providing rotational power to drive the compressor. Once the exhaust gas has passed through the turbine wheel (70) and the turbine wheel has extracted energy from the exhaust gas, the spent exhaust gas (101) exits the turbine housing (2) through the exducer (52) and is ducted to the vehicle downpipe and usually to the after-treatment devices such as catalytic converters, particulate and $NO_x$ traps.

The power developed by the turbine stage is a function of the expansion ratio across the turbine stage. That is the expansion ratio from the turbine inlet (51) to the turbine exducer (52). The range of the turbine power is a function of, among other parameters, the flow through the turbine stage.

The compressor stage consists of a wheel and its housing. Filtered air is drawn axially into the inlet (11) of the compressor cover (10) by the rotation of the compressor wheel (20). The power generated by the turbine stage to the shaft and wheel drives the compressor wheel (20) to produce a combination of static pressure with some residual kinetic energy and heat. The pressurized gas exits the compressor cover (10) through the compressor discharge (12) and is delivered, usually via an intercooler to the engine intake.

The design of the turbine stage is a compromise among the power required to drive the compressor; the aerodynamic design of the stage; the inertia of the rotating assembly, of which the turbine is a large part since the turbine wheel is manufactured typically in Inconel which has a density 3 times that of the aluminum of the compressor wheel; the turbocharger operating cycle which affects the structural and material aspects of the design; and the near field both upstream and downstream of the turbine wheel with respect to blade excitation.

Part of the physical design of the turbine housing is a volute, the function of which is to control the inlet conditions to the turbine wheel such that the inlet flow conditions provide the most efficient transfer of power from the energy in the exhaust gas to the power developed by the turbine wheel. Theoretically the incoming exhaust flow from the engine is delivered in a uniform manner from the volute to a vortex centered on the turbine wheel axis. To do this, the cross sectional area of the volute gradually and continuously decreases until it becomes zero. The inner boundary of the volute can be a perfect circle, defined as the base circle; or, in certain cases, such as a twin volute, it can describe a spiral, of minimum diameter not less than 106% of the turbine wheel diameter. The volute is defined by the decreasing radius of the outer boundary of the volute and by the inner boundary as described above, in one plane defined in the "X-Y" axis as depicted in FIG. 4, and the cross sectional areas, at each station, in the plane passing through the "Z" axis, as depicted in FIG. 16. The "Z" axis is perpendicular to the plane defined by the "X-Y" axis and is also the axis of the turbine wheel.

The design development of the volute initiates at slice "A", which is defined as the datum for the volute. The datum is defined as the slice at an angle of "P" degrees above the "X-axis of the turbine housing containing the "X"-axis, "Y"-axis and "Z"-axis details of the volute shape.

The size and shape of the volute is defined in the following manner: The widely used term A/R represents the ratio of the partial area at slice "A" divided by the distance from the centroid (161) of the shaded flow area (160) to the turbo centerline. In FIGS. 15A and 15B the centroids (161) determine the distance $R_A$ and $R_B$ to the turbo centerline. For different members of a family of turbine housings, the general shape remains the same, but the area at slice "A" is different as is the distance $R_A$. The A/R ratio is generally used as the "name" for a specific turbine housing to differentiate that turbine housing from others in the same family (with different A/R ratios). In FIG. 15A. the volute is that of a reasonably circular shape. In FIG. 15B the volute is that of a divided turbine housing which forces the shape to be reasonably triangular. Although the areas at slice "A" for both volutes are the same, the shapes are different and the radii to the centroids are different (due to the volute shape), so the A/Rs will be different. Slice "A" is offset by angle "P" from the "X"-axis. The turbine housing is then geometrically split into equal radial slices (often 30°, thus at [30x+P]°, and the areas ($A_{A-M}$) and the radii ($R_{A-M}$) along with other geometric definitions such as corner radii are defined. From this definition, splines of points along the volute walls are generated thus defining the full shape of the volute. The wall thickness is added to the internal volute shape and through this method a turbine housing is defined.

The theoretically optimized volute shape for a given area is that of a circular cross-section since it has the minimum surface area which minimizes the fluid frictional losses. The volute, however, does not act on its own but is part of a system; so the requirements of flow in the planes from slice "A", shown in FIG. 4 to the plane at slice "M", and from "M" to the tongue, influence the performance of the turbine stage. These requirements often result in compromises such as architectural requirements outside of the turbine housing, method of location and mounting of the turbine housing to the bearing housing, and the transition from slice "A" to the turbine foot (51) result in turbine housing volutes of rectangular or triangular section, as well as in circular, or combinations of all shapes. The rectangular shape of the volute (53) in FIG. 1, showing a section "D-K" is a result of the requirement not only to fit VTG vanes into the space such that the flow is optimized through the vanes and that the vanes can be moved and controlled by devices external to the turbine housing, but also to minimize the outline of the turbine housing so the turbocharger fits on an engine.

The turbine housing foot is usually of a standard design as it mates to exhaust manifolds of many engines. The foot can be located at any angle to, or position relative to, the "volute". The transition from the foot gas passages to the volute is executed in a manner which provides the best aerodynamic and mechanical compromise.

The roughly triangular shape of the volute in FIG. 2, taken at the same sections as those above, is the more typical volute geometry for fixed and wastegated turbine housings. The addition of the divider wall (21) is to reduce aerodynamic "cross-talk" between the volutes in an effort to maintain pulse flow, from a divided manifold, to harvest the pulse energy in the work extracted by the turbine wheel. The pressure pulses in the exhaust manifold are a function of the firing order of the engine.

Turbine housings are typically designed in families (typically up to 5 in a family) which use turbine wheels of the same diameter, or a group of wheels with close to the same diameter. They may use the same turbine foot size. For example, a family of turbine housings for a 63 mm turbine wheel may cover a range of A/Rs from 1.8 to 2.2. FIG. 5 depicts the area schedule for three volutes of a family. The largest volute is a 1.2 A/R volute, shown by the dotted line (40). The smallest volute is a 0.8 A/R volute; shown by the dashed line (41) and the mean volute, in the middle of the family, is shown by the solid line. The X-axis depicts the angle of the slice, from 30° (section "A") to 360° (the tongue); the Y-axis depicts the area of the section at the respective angle.

Some turbine wheels are specifically designed to harness this pulse energy and convert it to rotational velocity. Thus the conversion of pressure and velocity from the exhaust gas for a pulse flow turbine wheel in a divided turbine housing is greater than the conversion of pressure and velocity from a steady state exhaust flow to the turbine wheel velocity. This pulse energy is more predominant in commercial Diesel engines, which operate at around 2200 RPM, with peak torque at 1200 to 1400 RPM, than in gasoline engines which operate at much higher rotational speed, often up to 6000 RPM, with peak torque at 4000 RPM so the pulse is not as well defined.

The basic turbocharger configuration is that of a fixed turbine housing. In this configuration the shape and volume of the turbine housing volute (53) (FIG. 1) is determined at the design stage and cast in place.

The next level of sophistication is that of a wastegated turbine housing. In this configuration the volute is cast in place, as in the fixed configuration above. In FIG. 2, the wastegated turbine housing features a port (54) which fluidly connects the turbine housing volute (53) to the turbine housing exducer (52). Since the port on the volute side is upstream of the turbine wheel (70), and the other side of the port, on the exducer side, is downstream of the turbine wheel, flow through the duct connecting these ports bypasses the turbine wheel (70), thus not contributing to the power delivered to the turbine wheel.

The wastegate in its most simple form is a valve (55), which can be a poppet valve. It can be a swing type valve similar to the valve in FIG. 2. Typically these valves are operated by a "dumb" actuator which senses boost pressure or vacuum to activate a diaphragm, connected to the valve, and operates without specific communication to the engine ECU. The function of the wastegate valve, in this manner, is to cut the top off the full load boost curve, thus limiting the boost level to the engine. The wastegate configuration has no effect on the characteristics of the boost curve until the valve opens. More sophisticated wastegate valves may sense barometric pressure or have electronic over-ride or control, but they all have no effect on the boost curve until they actuate to open or close the valve.

FIGS. 6A and 6B represent compressor maps. The "Y" axis (61) represents the boost or pressure ratio level and the "X" axis (60) represents the expansion ratio. FIG. 6A depicts the boost curve (67) for a fixed turbine housing. In this configuration as the turbo speed rises the upper part (65) of the boost curve continues to increase in pressure ratio as the mass flow through the wheel continues to increase. FIG. 6B depicts the boost curve (68) for a wastegated turbine housing of the same A/R as that for FIG. 6A, or a wastegated turbine housing in which the wastegate valve did not open. In FIG. 6B it can be seen that the lower shape of the boost curve (68) is exactly the same as the lower part boost curve (67) in FIG. 6A to the point (66) at which the valve opens. After this point, the boost curve (62) is relatively flat, so as the turbo speed increases the boost curve is controlled at a max. level while the massflow through the wheel continues to increase. While a wastegate can be used to limit boost levels, its turbine power control characteristics are rudimentary and coarse.

A positive byproduct of wastegated turbine housings is the opportunity to reduce the A/R of the turbine housings. Since the upper limit of the boost is controlled by the wastegate, a reduction in A/R can provide better transient response characteristics. If the wastegated turbocharger has a "dumb" actuator, which operates on a pressure or vacuum signal only, and is operated at altitude, then the critical pressure ratio at which the valve opens is detrimentally affected. Since the diaphragm in the actuator senses boost pressure on one side, and barometric pressure on the other, the tendency is for the actuator to open later (since the barometric pressure at altitude is lower than that at sea level) resulting in over-boost of the engine.

Engine boost requirements are the predominant drivers of compressor stage selection. The selection and design of the compressor is a compromise between the boost pressure requirement of the engine; the mass flow required by the engine; the efficiency required by the application; the map width required by the engine and application; the altitude and duty cycle to which the engine is to be subjected; the cylinder pressure limits of the engine; etc.

The reason this is important to turbocharger operation is that the addition of a wastegate to the turbine stage allows matching to the low speed range with a smaller turbine wheel and housing. Thus the addition of a wastegate brings with it the option for a reduction in inertia. Since a reduction in inertia of the rotating assembly typically results in a reduction of particulate matter (PM), wastegates have become common in on-highway vehicles. The problem is that most wastegates are somewhat binary in their operation, which does not fit well with the linear relationship between engine output and engine speed.

The next level of sophistication in boost control of turbochargers is the VTG (the general term for variable turbine geometry). Some of these turbochargers have rotating vanes; some have sliding sections or rings. Some titles for these devices are: Variable turbine geometry (VTG), Variable geometry turbine (VGT), variable nozzle turbine (VNT), or simply variable geometry (VG).

VTG turbochargers utilize adjustable guide vanes FIGS. 3A and 3B, rotatably connected to a pair of vane rings and/or the nozzle wall. These vanes are adjusted to control the exhaust gas backpressure and the turbocharger speed by modulating the exhaust gas flow to the turbine wheel. In FIG. 3A the vanes (31) are in the minimum open position. In FIG. 3B the vanes (31) are in the maximum open position. The vanes can be rotatably driven by fingers engaged in a unison ring, which can be located above the upper vane ring. For the sake of clarity, these details have been omitted from the drawings. VTG turbochargers have a large number of very expensive alloy components which must be assembled and positioned in the turbine housing so that the guide vanes remain properly positioned with respect to the exhaust supply flow channel and the turbine wheel over the range of thermal operating conditions to which they are exposed. The temperature and corrosive conditions force the use of exotic alloys in all internal components. These are very expensive to procure, machine, and weld (where required). Since the VTG design can change turbocharger speed very quickly, extensive software and controls are a necessity to prevent unwanted speed excursions. This translates to expensive actuators. While VTGs of various types and configurations have been adopted widely to control both turbocharger boost levels and turbine backpressure levels, the cost of the hardware and the cost of implementation are high.

In order to keep flow attached to the volute walls and to keep the shape of the volute appropriate to the function of the volute, an A/R schedule is plotted, as in FIG. 5, to ensure that there exist no inappropriate changes in section. In FIG. 5, the "X" axis is the angle for each section. The angles could be substituted by the defining letters "A" though "M" as used in FIG. 4. The "Y" axis depicts the radius of the section. The dotted line (40) is the area schedule for the largest A/R of the family. The dashed line (41) is the area schedule for the smallest A/R of the family.

If one considers a wastegated turbo as a baseline for cost, then the cost of a typical (VTG) in the same production volume is from 270% to 300% the cost of the same size fixed, turbocharger. This disparity is due to a number of pertinent factors from the number of components, the materials of the components, the accuracy required in the manufacture and machining of the components, to the speed, accuracy, and repeatability of the actuator. The chart in FIG. 7 shows the comparative cost for the range of turbochargers from fixed to VTGs. Column "A" represents the benchmark cost of a fixed turbocharger for a given application. Column "B" represents the cost of a wastegated turbocharger for the same application, and column "C" represents the cost of a VTG for the same application.

Thus it can be seen that for both technical reasons and cost drivers that there needs to be a relatively low cost turbine flow control device which fits between wastegates and VTGs in terms of cost. The target cost price for such a device needs to be in the range of 145% to 165% that of a simple, fixed turbocharger.

SUMMARY OF THE INVENTION

The present invention relates to a simplified, low cost, variable nozzle to control exhaust gas flow to a turbine wheel in a variable flow turbocharger. The boost pressure can be modulated by controlling the nozzle flow volume. The invention is based on the idea that flow path of exhaust gas to the turbine wheel (70) of a twin volute turbocharger is influenced by the shape and size of the nozzle formed by the shape (22) of the divider wall (21) and the shape of the flow passage determined by the walls (85, 86) of the turbine housing. By moving the walls (85, 86) toward, or away from the divider wall, the flow of exhaust gas through the nozzle, to the turbine wheel (70) can be modulated, which thus modulates the turbocharger boost pressure. In another embodiment, the nozzle formed by these walls and the divider wall is changed by rotating cylinders (58, 59) containing these walls such that the gap to the divider wall is changed, modulating the exhaust flow to the turbine wheel (70) and thus modulating the boost pressure. In yet another embodiment, the divider wall is constructed as a separate component, with the inner tip of the divider wall designed as a spiral, changing the "tip-to-tip" ratio to the turbine wheel at given sections. Rotation of the spiral divider wall changes the nozzle width as described above to modulate the turbine flow and thus boost pressure. The invention also applies to single volute turbines.

BRIEF DESCRIPTION OF THE DRAWINGS

The present invention is illustrated by way of example and not limitation in the accompanying drawings in which like reference numbers indicate similar parts, and in which:

FIGS. 3A,B depict a pair of sections of a typical VTG turbocharger;

FIGS. 11A,B depict a pair of magnified sections of FIG. 11;

FIGS. 12A,B depict the third embodiment of the invention;

DETAILED DESCRIPTION OF THE INVENTION

Since the use of vanes in variable geometry turbochargers attenuates the pulse flow component available in the exhaust flow, the inventors sought to be able to modulate turbine flow to the turbine wheel, while maintaining the pulse energy in the exhaust flow. To do this the inventors found that by modifying the nozzle formed by the divider wall on one side, and the contour surfaces in the turbine housing, on the other side, the turbine flow could be modulated without loss of pulse energy.

Figure 9:
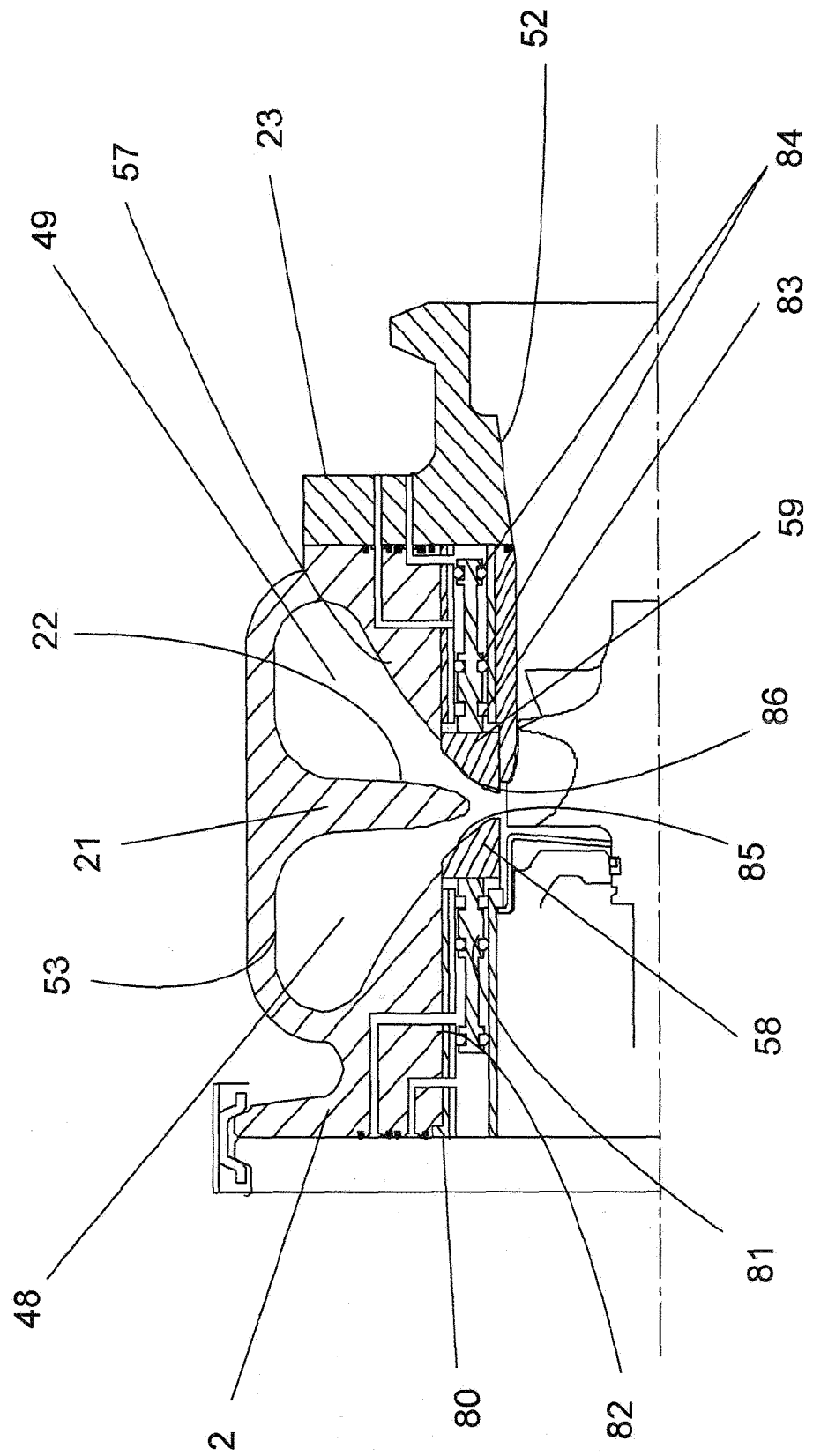
FIG. 9 depicts a magnified section of FIG. 8A.
Figure 10:
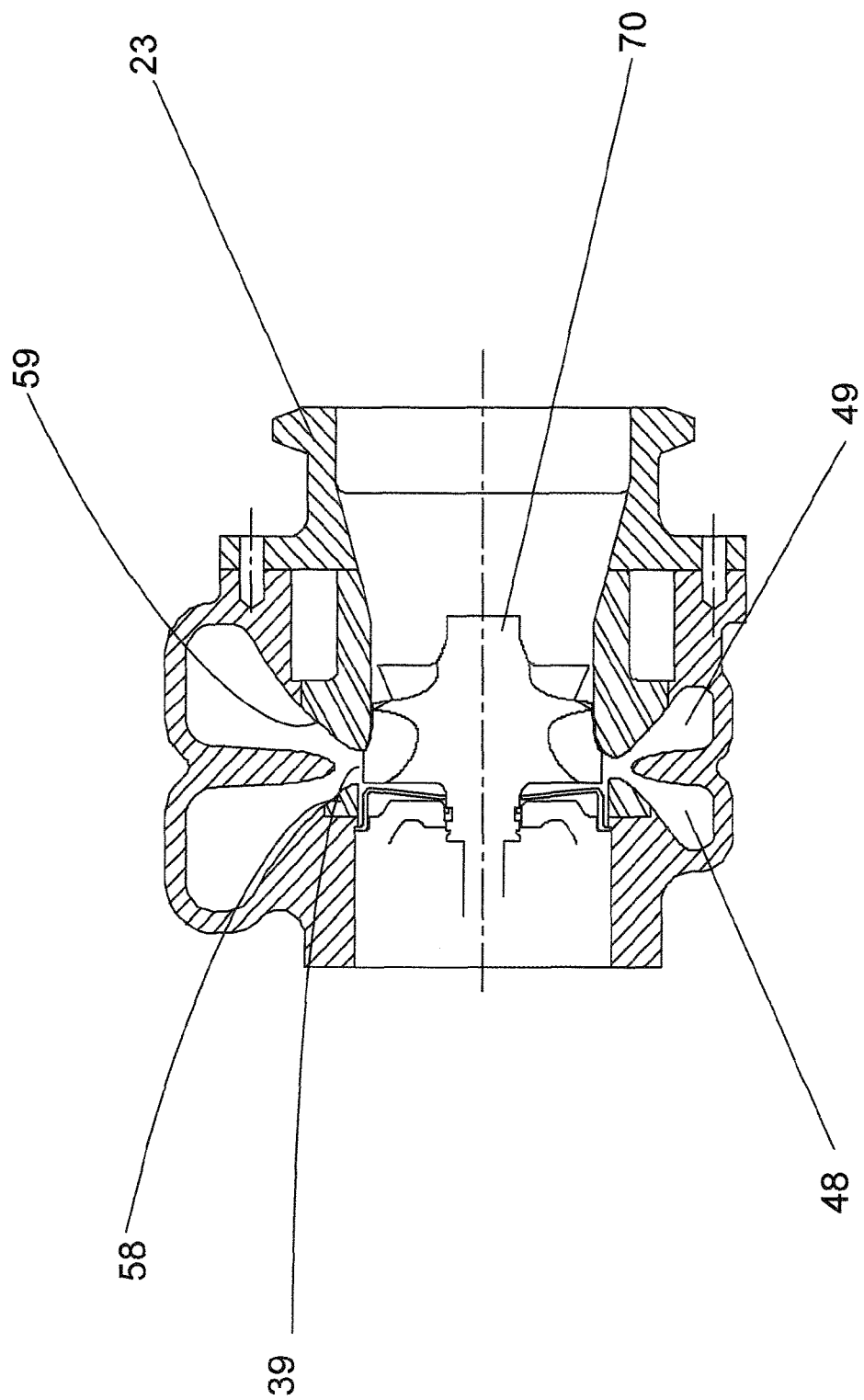
FIG. 10 depicts a section of the second embodiment of the invention.

The first embodiment of this invention can be seen in FIG. 9. In this embodiment a cylindrical portion of the contoured surface (86) adjacent to the divider wall surface (22) is formed on an end face of a cylinder (59) configured to move towards, and away from, the divider wall in a direction parallel to the turbocharger axis. By a like configuration, the contoured surface (85) leading to the turbine wheel (70) is formed on a face of a cylinder (58) which is also moveable closer to, and further from, the divider wall.

Figure 8B:
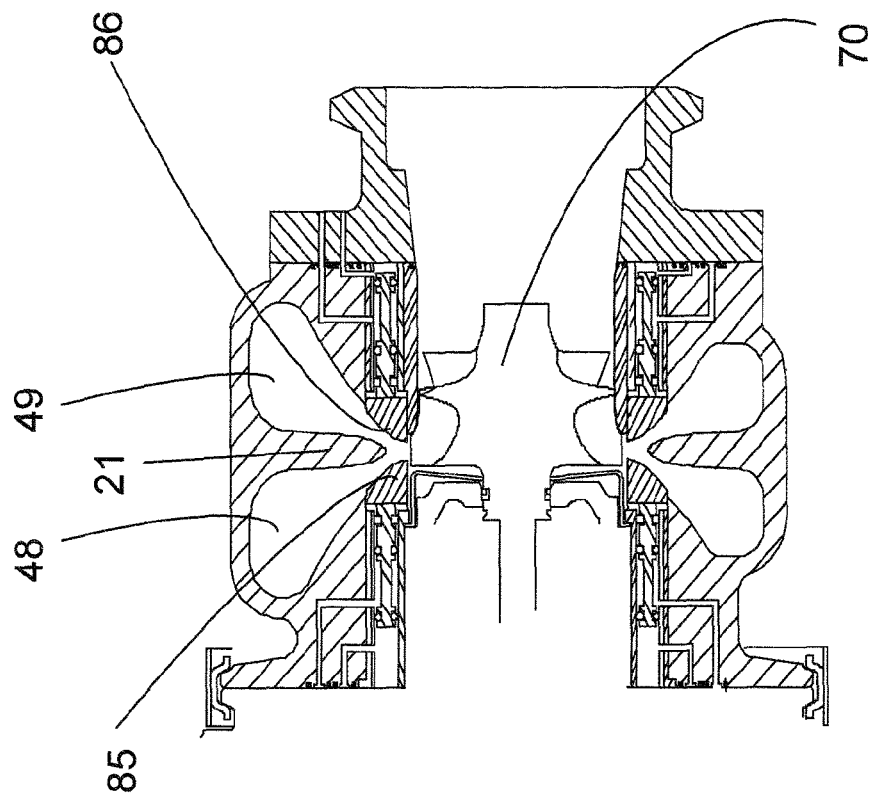
FIGS. 8A,B depict a pair of sections of the first embodiment of the invention.
Figure 8A:
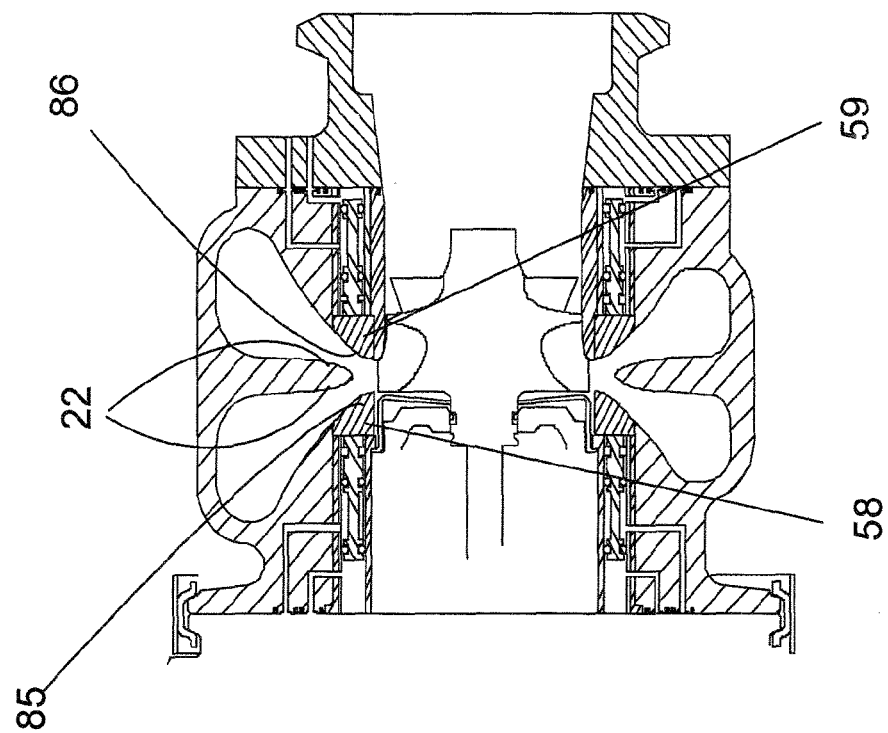

As can be seen in FIGS. 8A and 8B, when the contoured surfaces move, the nozzle formed by the contoured surfaces (85 and 86) and the adjacent surfaces (22) on the divider wall (21) can be manipulated. This manipulation causes the flow thorough the nozzle to change in a modulatable fashion which controls the flow to the turbine wheel. FIG. 8A shows the contoured surfaces in the retracted position. FIG. 8B shows the contoured surfaces in the extended position.

Figures 15A, 15B:
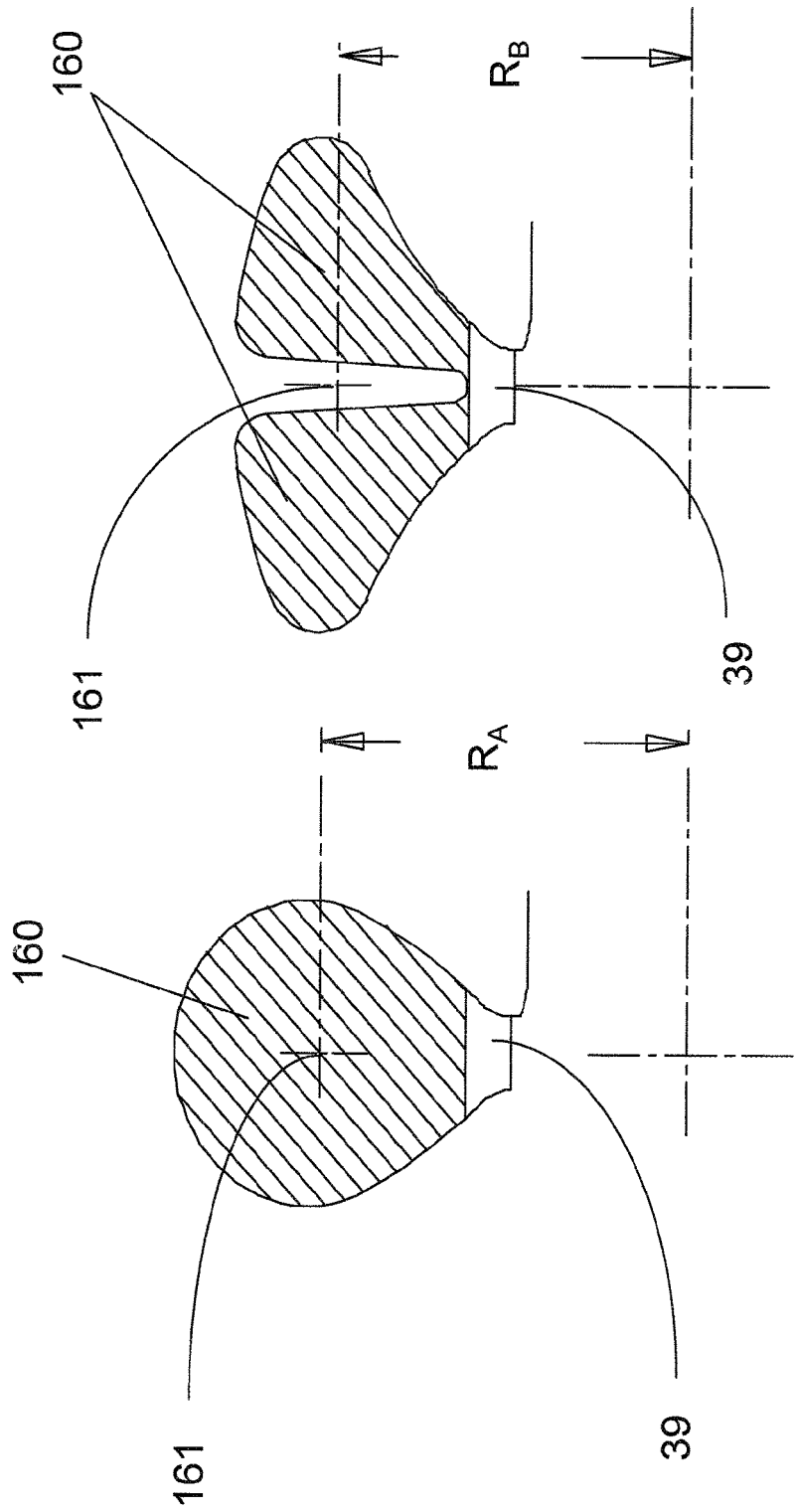
FIGS. 15A,B depict the sections of some volutes at slice "A"

Depending upon the flow requirement, both inner and outer cylinders can be moved in synchrony. If in the management system of an internal combustion engine, combustion chamber de-activation is used, or in the case of fewer than the total number of engine combustion chambers providing only EGR flow, the flow into the exhaust manifold, and hence the pressure and flow in the turbine housing, is unbalanced so the cylinders (58, 59) containing the contoured surfaces (85,86) could move asymmetrically. The configuration shown for the invention is that of a divided turbine housing as depicted in FIG. 15B. In that turbine housing volute configuration, the sensitivity of the nozzle formed by the proximity of the contoured surfaces and the divider wall, may allow asymmetric movement of the cylinders (58, 59) containing the contoured surfaces (85, 86). In the case of an open turbine housing volute (ie one with no divider wall) as depicted in FIG. 15A, it is assumed that with less sensitivity, both cylinders (58,59) containing the contoured surfaces (85,86), would move.

While there can be many methods which will move these "cylinders" (pneumatic, hydraulic, electro-mechanical, etc.), for the purpose of understanding the invention, one method will be described.

Since the divider wall (21) is part of the turbine housing casting, it is not possible to fit the rings from the inside of the housing. In order to fit them from the outside the cylinders (59, 58) are mounted in an outer housing (80) which fits into a bore (82) in the turbine housing. Within this outer cylinder are pistons (81) which are sealed with "O" ring seals (84) to provide seals between the inside diameter bores of the cylinder and the outside edges of the pistons. The pistons also can carry piston rings (83) to seal gas pressure from the exhaust flow in the turbine housing, from the hydraulic compartments. There could also be gas seals on the inner and outer walls of the cylinders (58 and 59) to seal gas pressure against the bores, in which they are located. Pneumatic or hydraulic pressure is delivered to the turbine housing through a series of galleries to provide flow and pressure to the cylinders (58, 59), causing motion towards, or away from the center line of the volute. The pressure to the inner cylinder may be supplied through the bearing housing. The closure to the open face of the outer and inner cylinders is provided by the adaptor (23) which not only provides a face to the pressure "O" rings on each pressure gallery, but also provides the interface mechanism to locate and retain the vehicle down pipe.

In a second embodiment of the invention, the contoured surfaces (85, 86) are again mounted on cylinders (58, 59). Whereas in the first embodiment the cylinder, upon which are mounted contoured surfaces, moves axially to modify the nozzle (39) formed by the contoured surface and the adjacent surfaces (22) of the divider wall, in the second embodiment the cylinder is made to rotate about the turbocharger axis thus changing the nozzle volume.

Figure 1:
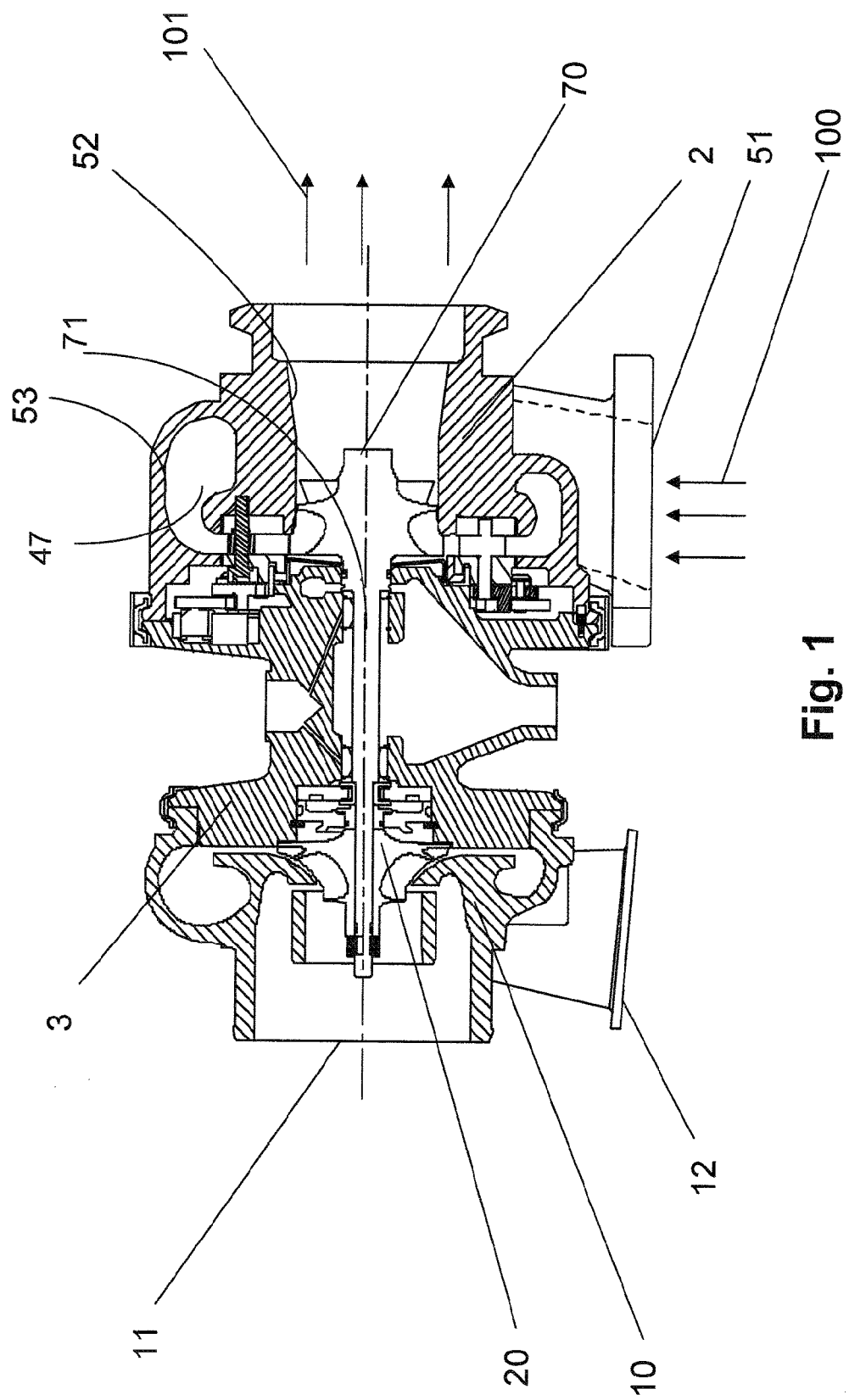
FIG. 1 depicts the section for a typical VTG turbocharger.
Figures 2A, 2B:
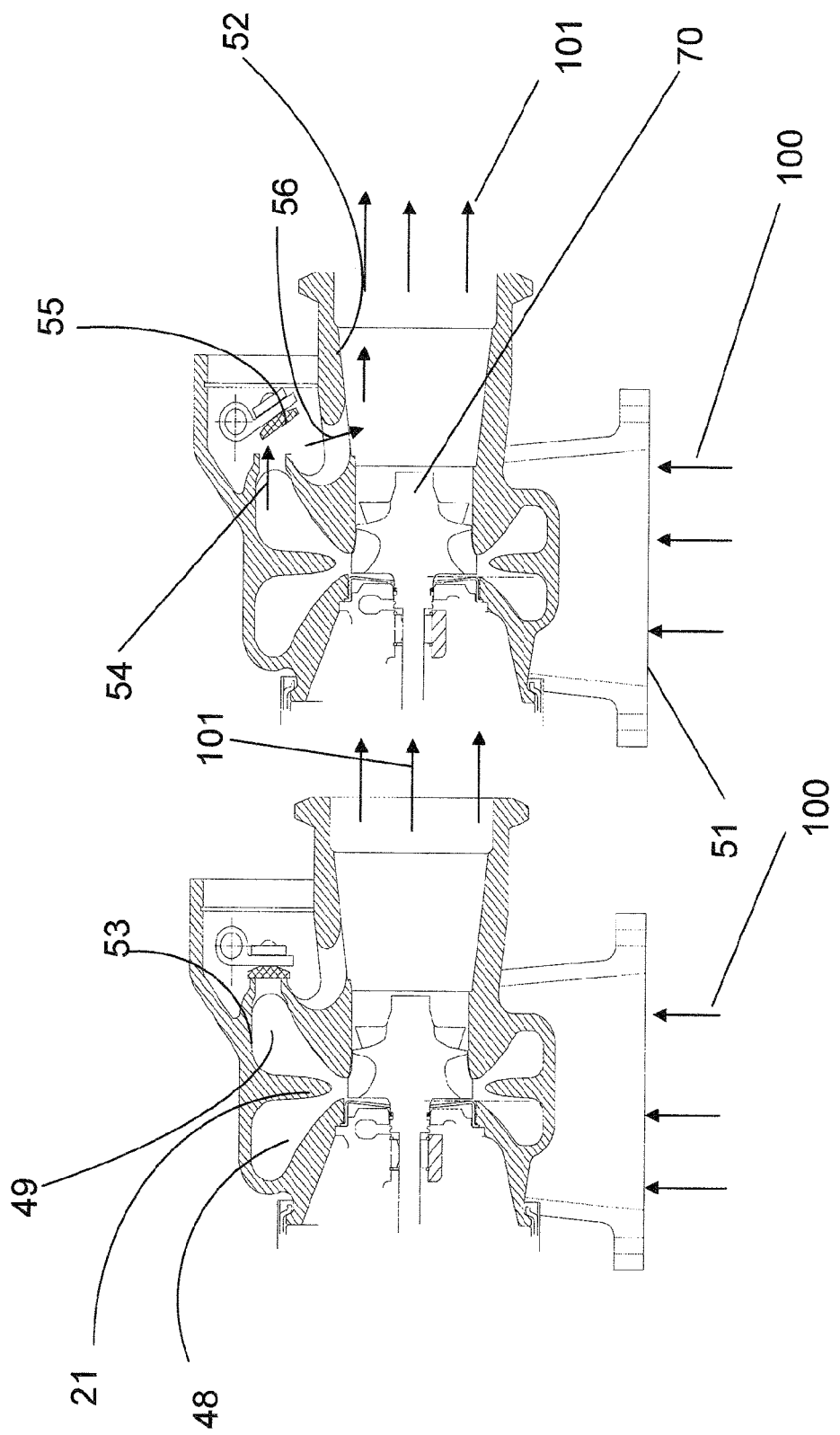
FIGS. 2A,B depict a pair of sections of a typical wastegated turbocharger.
Figure 4:
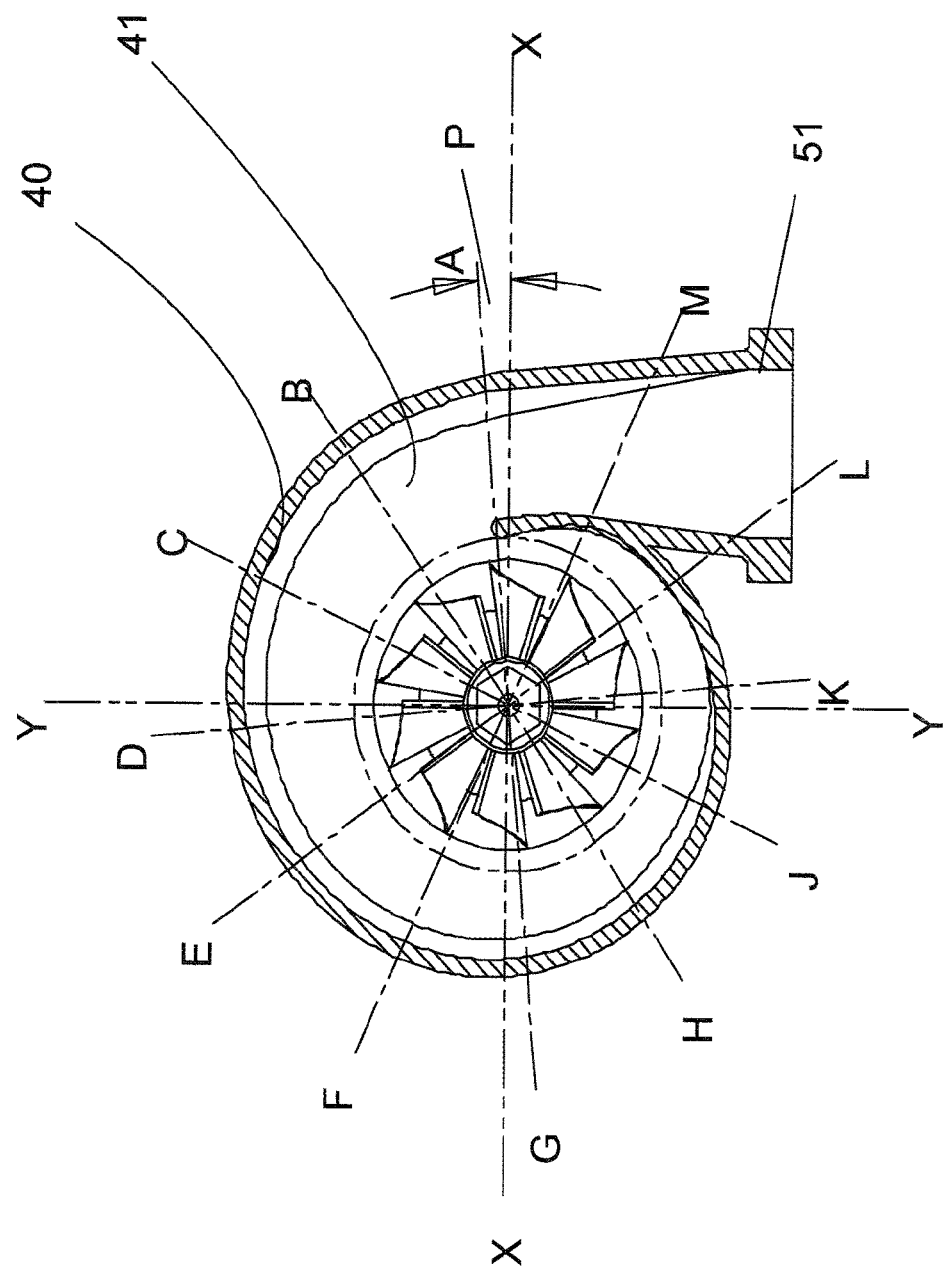
FIG. 4 depicts a section of a typical fixed turbine housing showing construction radial lines.
Figure 5:
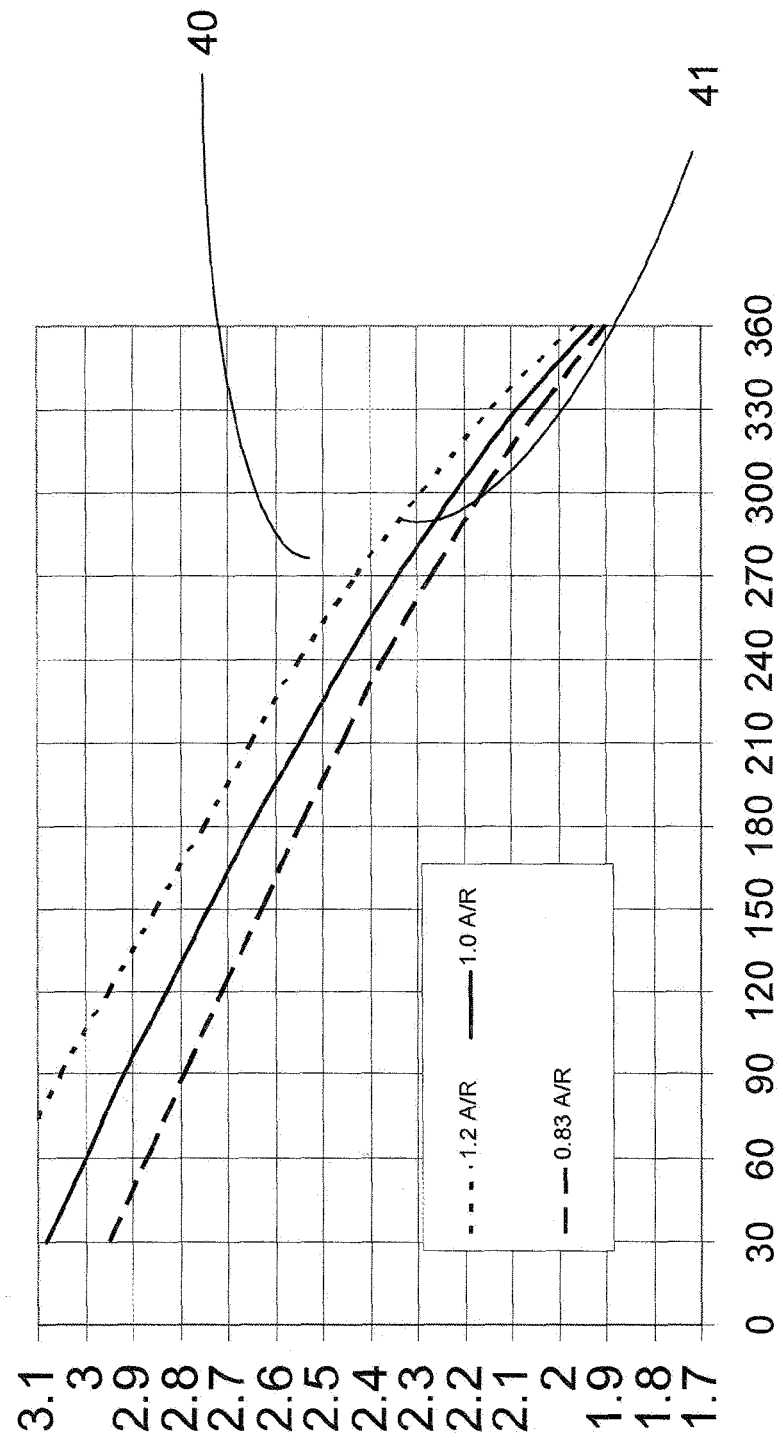
FIG. 5 is a chart of cross-sectional area development.
Figures 6A, 6B:
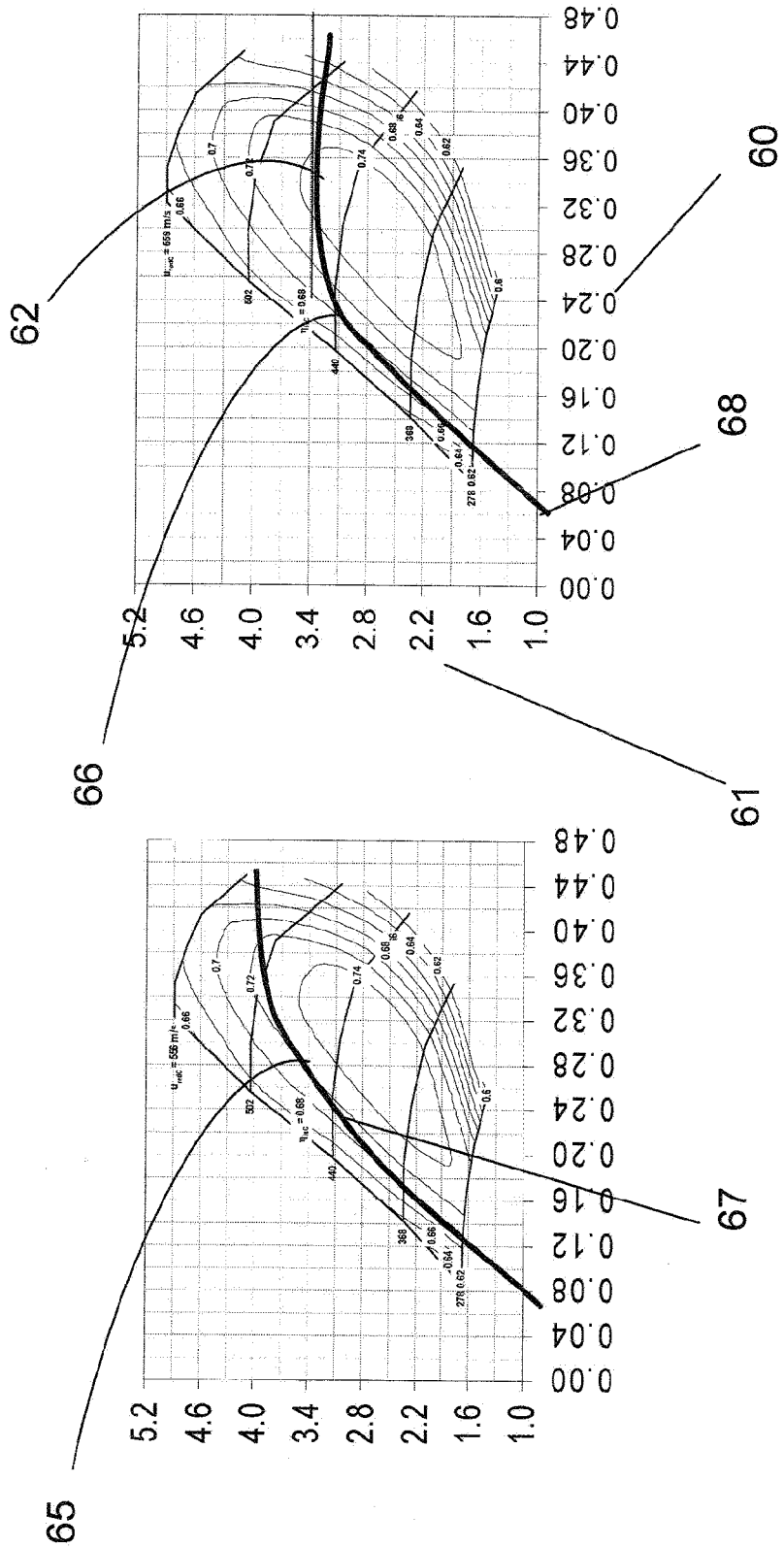
FIGS. 6A,B depict the compressor maps for a typical fixed, and a wastegated turbocharger.
Figure 7:
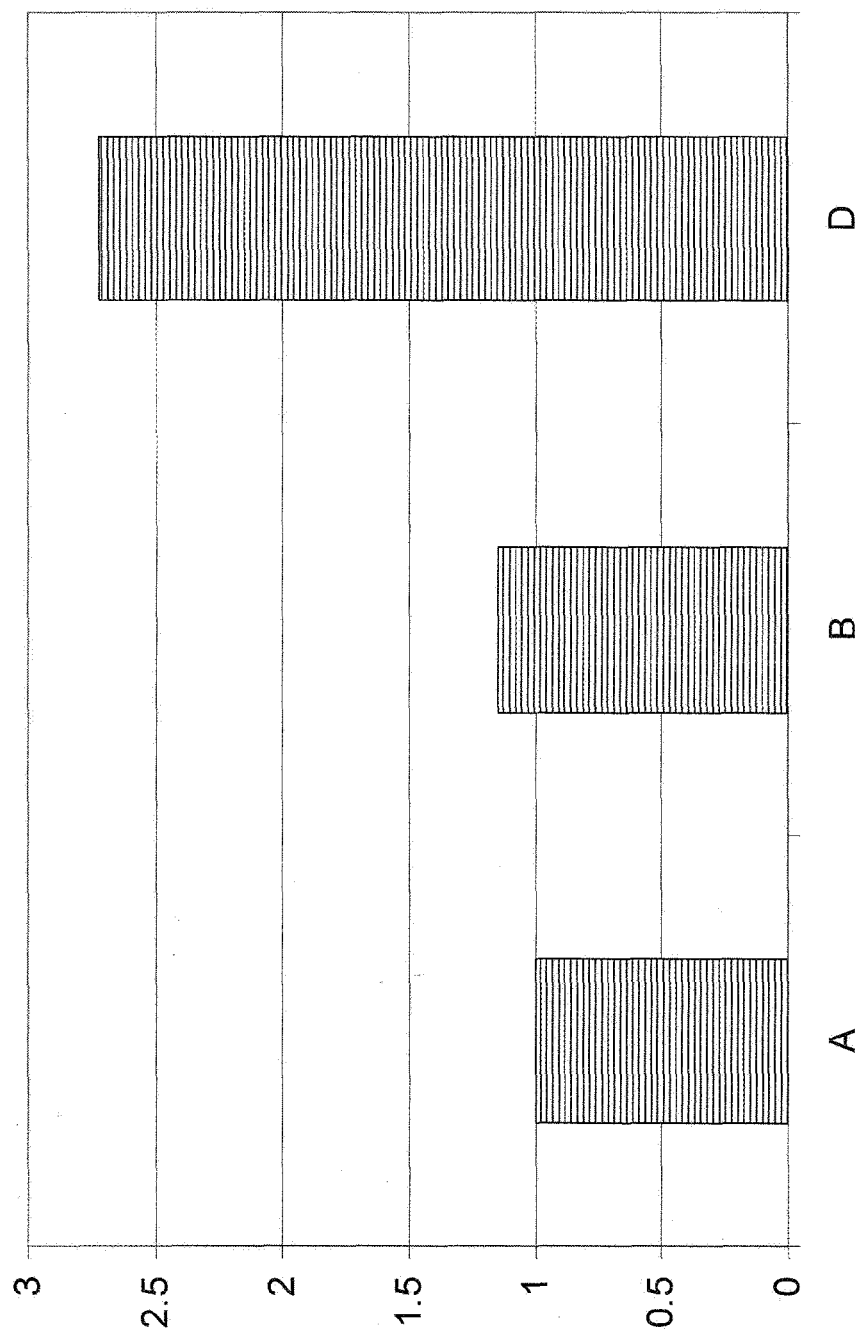
FIG. 7 is a chart showing turbocharger relative costs.

In this second embodiment the inventors realized that the position and shape of the divider wall, with respect to the turbine housing is relatively constant. The shape and axial position of the contoured surfaces (86 and 85) can be made to match the flow from the varying sections ("A" through "M" FIG. 4) to the turbine wheel. In FIGS. 11A and 11B it can be seen that the inside slope of the lines (87, 88) connecting the contoured surfaces (86 and 85) are angled to the divider wall centerline (D-K). The nozzle volume at slice "D" being greater than the nozzle volume at slice "G". By rotating the cylinder (86) about the axis of the turbocharger, the space "B" in FIG. 11A, between the divider wall centerline (D-K) and the surface inner wall (87) is reduced to the space "B" in FIG. 11B.

In a similar manner on the inner cylinder (58) by rotating the inner cylinder (58) about the turbocharger axis, the space "A" between the divider wall centerline (D-K) and the surface inner wall (88) in FIG. 11A and the space "A" in FIG. 11B is reduced.

As in the first embodiment a cover plate or closure (23) is mounted to the turbine housing to provide both a closure to the entry point of the cylinder (59) and to provide the interface mechanism to locate and retain the vehicle down pipe.

Since the cylinder (58) on the bearing housing side of the turbine housing can be fitted from the joint of the turbine housing to the bearing housing, there exist numerous options for the method of insertion and sealing. The power to drive the rotation of said cylinders (58, 59) can be hydraulic pneumatic, electric, electro-mechanical, or mechanical, the choice typically being driven by the options given the turbocharger manufacturer by the engine/vehicle manufacturer.

The third embodiment of this invention involves the same aerodynamic adjustment of the nozzle but in a more complex manner.

Figure 13:
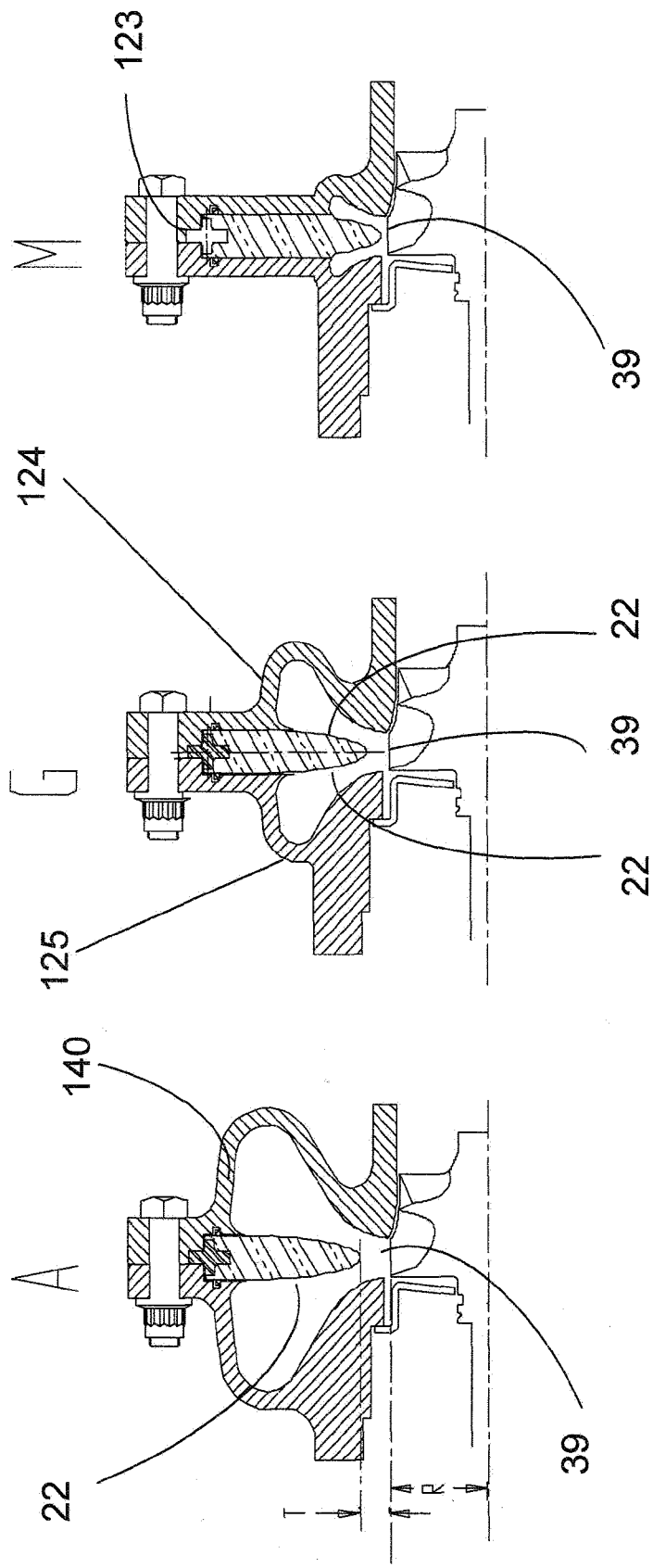
FIGS. 13A,B,C depict magnifications of FIG. 12 at three different slices.

Since the distance from the tip of the divider wall to the tip of the turbine wheel, (FIG. 13 "T") often referred to as the "tip-to-tip" ratio, is critical to performance, the tip to tip ratio should be kept to no less than 106% of the turbine wheel diameter for blade excitation reasons, and no more than 106% for efficiency reasons. In FIG. 13, for a turbine wheel diameter of "R" the ratio would be:

$$\frac{("R"+"T")}{"R"}$$

With a cast divider wall, in a cast turbine housing, the dross generated by the casting process is driven to the tip of the thin divider wall which produces an undesirable material composition at the tip of the divider wall. This low quality material has a tendency to prematurely fatigue and fall out of the divider wall into the turbine wheel, damaging the turbine wheel. To prevent this occurrence, the divider walls are cast thicker than would be aerodynamically desired, and shorter (thus further from the optimum tip-to-tip ratio) to minimize the thermal stress in the divider wall.

The inventors realized that if the divider wall was not cast in the turbine housing casting process but manufactured, externally from the turbine housing, from a higher quality material than that of the turbine housing casting, then the tip-to-tip clearance could be made to the minimum ratio to provide maximum performance. They also came to realize that if the divider wail was made outside of the turbine housing casting process, that the inside edge, the tip of the divider wall, could describe a spiral from the normal tip-to-tip ratio, to the optimum tip-to-tip ratio and that if the divider wall profile was sufficiently "fat" that rotation of the divider wall could change not only the nozzle volume, but also the tip-to-tip ratio and thus provide a variable flow and efficiency tool.

Figure 14:
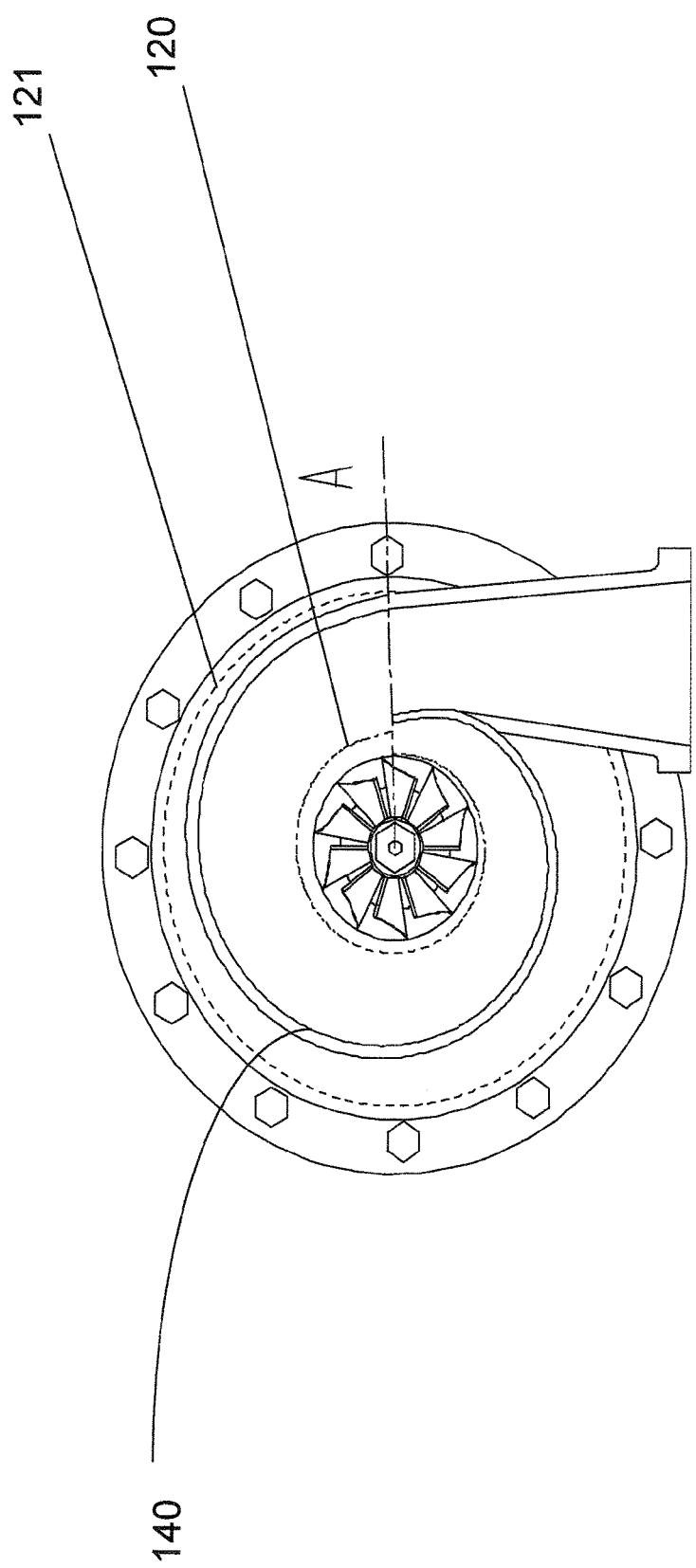
FIG. 14 depicts a side view of the third embodiment.

In FIG. 12A the outer edge (121) of the divider wall describes a constant radius. The inside edge of the divider wall (120) describes a spline, or spiral. As shown in FIGS. 13, A, B, C, mounted on the outer end of the divider wall is a plurality of rollers (122), which fit into a groove (123), provided in one part of the turbine housing (124). Another part of the turbine housing (125) provides the closure to both capture the rollers, and to seal the two parts of the turbine housing together. In FIG. 14 it can be seen that the constant radius (121) sits outside of the volute (140) and the fasteners which are required to join the inner part (125) of the turbine housing to the outer part (124) of the turbine housing are shown. While these fasteners allow ease of assembly and disassembly, the two parts of the turbine housing could be fastened in any manner from welding to a purely mechanical method.

Since the divider wall both initiates and terminates at the tongue, accommodation has to be made in the tongue to allow the rotatable divider wall to rotate into, and out of a "housing" so that the rotation of said divider wall does not result in a gap in the divider wall. This can be done, without affecting the A/R at the start and finish of the tongue (section M to A) by adjusting the shape of the tongue and accommodating for the volume in another wall, while maintaining the area at the pertinent section.

Now that the invention has been described,

We claim:

1. A turbocharger comprising:
   a turbine housing (2) including at least one volute (47, 48, 49),
   a turbine wheel (70) carried within the turbine housing and adapted to being driven by exhaust gas,
   a transition area (39) where exhaust from the volute(s) is transmitted to the turbine wheel,
   first and second cylinders (81) with end faces (58, 59) with contours (85, 86) defining said transition area, wherein said first contour (85) is part of said first cylinder end face (58), generally coaxial and concentric to the turbine wheel and movable parallel to the axis of rotation of the turbine wheel, and wherein said second contour (86) is part of a said second cylinder end face (59), generally coaxial and concentric to the turbine wheel and movable parallel to an axis of rotation of the turbine wheel; and
   drive means for simultaneously moving said first and second cylinder end faces towards each other.

2. The turbocharger as in claim 1, wherein said turbine housing includes first and second volutes (48, 49) separated by a divider wall (21).

3. The turbocharger as in claim 1, wherein said turbine housing includes a single volute (47).

4. The turbocharger as in claim 1, wherein said transition area (39) narrows from said volute towards said turbine wheel.

5. The turbocharger as in claim 1, further including drive means for moving said first and second cylinder end faces apart from each other.

6. The turbocharger as in claim 1, wherein said drive means is selected from pneumatic, hydraulic, and electro-mechanical.

7. A turbocharger comprising:
   a turbine housing including one or more volutes (47, 48, 49) separated by a divider wall (21),
   a turbine wheel carried within the turbine housing and extracting energy from the exhaust gas,
   a transition area where exhaust from the twin volutes is transmitted to the turbine wheel,
   first and second cylinders (81) with end faces (58, 59) with contours (85, 86) defining said transition area,
   wherein said first contour (85) is part of a first cylinder end face (58), generally concentric to the turbine wheel and movable parallel to an axis of rotation of the turbine wheel, and wherein said second contour (86) is part of a cylinder end face (59), generally concentric to the turbine wheel and movable parallel to an axis of rotation of the turbine wheel; and
   drive means for independently moving said first and second cylinder end faces towards each other.

8. A turbocharger comprising:
   a turbine housing including first and second volutes (49, 49) separated by a divider wall (21),
   a turbine wheel carried within the turbine housing and extracting energy from the exhaust gas,
   a transition area where exhaust from the twin volutes is respectively transmitted to the turbine wheel,
   first and second cylinder (81) end faces (58, 59) with contours (85, 86) defining said transition area, wherein said first contour (85) is part of a first cylinder end face (58), generally concentric to the turbine wheel and rotatable about the turbocharger axis, and wherein said second contour (86) is part of a cylinder end face (59), generally concentric to the turbine wheel and rotatable about the turbocharger axis;
   wherein contoured surfaces of the turbine housing define a nozzle-like transition area between volute and turbine wheel having a spiral shape cooperating with the spiral shape of the divider wall, and
   wherein rotating said first and second cylinder end faces (58, 59) about said turbocharger axis changes the clearance between cylinder end faces and said divider wall.

9. A turbocharger comprising:
   a turbine housing including first and second volutes (48, 49) separated by a divider wall (21),
   a turbine wheel carried within the turbine housing and extracting energy from the exhaust gas,
   a transition area where exhaust from the twin volutes is respectively transmitted to the turbine wheel,
   wherein the inner diameter (120) of said divider wall is spiral shaped,
   wherein said divider wall is mounted for rotating about the turbocharger axis,
   wherein contoured surfaces of the turbine housing define a nozzle-like transition area between volute and turbine wheel having a spiral shape cooperating with the spiral shape of the divider wall, and
   wherein rotating said divider wall about said turbocharger axis changes the clearance between said spiral shapes.

* * * * *